(No Model.)
S. & G. H. HARRISON.
TURBINE.
No. 530,520. Patented Dec. 11, 1894.
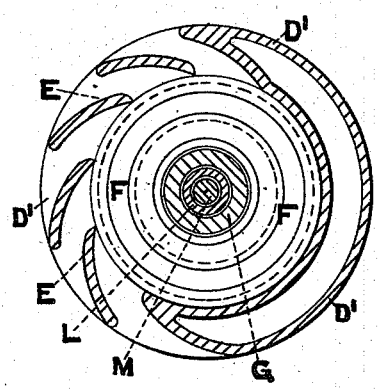
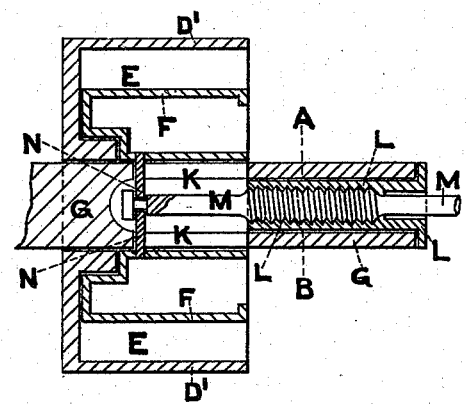
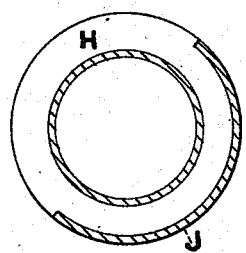
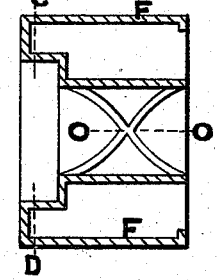
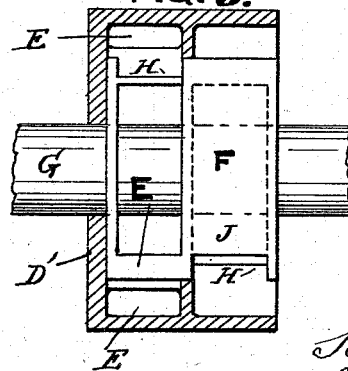
Witnesses
John E. Walsh
Herbert Dunn
Inventors:
Samuel Harrison
George Henry Harrison

UNITED STATES PATENT OFFICE.

SAMUEL HARRISON AND GEORGE HENRY HARRISON, OF RIPON, ENGLAND.

TURBINE.

SPECIFICATION forming part of Letters Patent No. 530,520, dated December 11, 1894.

Application filed June 2, 1894. Serial No. 513,309. (No model.) Patented in England February 16, 1894, No. 3,355.

*To all whom it may concern:*

Be it known that we, SAMUEL HARRISON and GEORGE HENRY HARRISON, subjects of the Queen of Great Britain, residing at Ripon, in the county of York, England, have invented new and useful Improvements in and Connected with Turbines, (for which we have obtained a patent in Great Britain, No. 3,355, bearing date February 16, 1894,) of which the following is a specification.

Our invention has reference to certain improvements in and connected with turbines.

The object of our invention is to regulate the flow of water to outward re-action turbines by closing or opening, on the inside, one or more of the jets, by means of a regulator fixed centrally and internally to the turbine, and revolving with the turbine, and which regulator is capable of being moved or set, or adjusted relatively to the turbine.

In the drawings Figure 1, is a sectional side elevation of our invention. Fig. 2, is an end elevation in section, through the line A, B, of Fig. 1. Fig. 3, is a detail sectional side elevation of regulator as shown in Figs. 1 and 2. Fig. 4, is a sectional end elevation through the line C, D, of Fig. 3. Fig. 5 is a cross-section through the turbine, with the regulator in elevation. Fig. 6, is an end view of regulator boss.

In carrying out our invention the turbine D' may be divided longitudinally or sectorially into two or more parts and each part may have any required number of jets. In the drawings annexed five jets E are shown. The regulator F consists of an annular ring or sectors centered on a shaft G and divided longitudinally or sectorially into a corresponding or similar number of parts as the turbine. Each part has an opening H, the remainder being solid or closed (see J Fig. 4), to cover or uncover the jets E, as may be desired.

The regulator F may be moved by hand and when set where required will revolve (by frictional contact or otherwise) with the turbine.

Whether divided longitudinally or sectorially, the turbine D' has its parts so arranged that the jets are upon diametrically opposite sides of it, or in such relation to each other as to secure regularity of action. When the regulator is moved to close one jet of one part it closes simultaneously a corresponding jet of each of the other parts so that the regularity of motion is not affected. The remaining jets continue to deliver their full streams of water, and the turbine runs more economically than when the water escapes through a series of partially closed openings.

Fig. 5 illustrates a turbine divided longitudinally into two parts. In this form of turbine the openings and solid portions of the regulator are shown, the opening of one part being diametrically opposite the solid portion of the same part, and adjacent to the solid portion of the other part. The said regulator F may also be moved mechanically into any position relatively to the turbine. For this purpose the shaft G is hollowed out and slotted at K. Within the said hollow shaft G, is a sleeve L, internally threaded screwing into which is a screwed rod M, at one end of which is swiveled a cross-piece N which moves in the spiral grooves O, so causing the regulator F when the rod M is revolved to move clockwise or the reverse, by which movements the jets E are covered or uncovered, as desired.

The rod M may be prolonged to the outside of the turbine case and revolved by hand or any suitable governor.

The threaded sleeve L may be fixed on the outside of the shaft G, but is preferably fixed as shown in the drawings annexed.

What we claim as our invention, and desire to secure by Letters Patent, is—

1. The combination, with a hollow driving shaft, and an annular turbine wheel secured thereon and provided with jets E arranged in separate groups substantially opposite each other; of a cylindrical regulator journaled on the said shaft and inside the turbine wheel, and provided with openings H, one for each group of jets; and adjusting mechanism carried by the said hollow shaft and operatively connected with the said regulator, substantially as and for the purpose set forth.

2. The combination, with a turbine wheel provided with jets E, and the hollow turbine shaft provided with slots K; of the annular regulator journaled inside the turbine wheel and provided with the opening H at its periphery and spiral slots in its hub; the plate N sliding longitudinally in the slots K and engaging with the said spiral slots, a screwthreaded sleeve secured in the hollow turbine shaft, and a revoluble screwthreaded rod engaging with the said sleeve and provided with an annular groove journaled in the said plate, whereby the regulator is adjusted, substantially as set forth.

SAMUEL HARRISON.
GEORGE HENRY HARRISON.

Witnesses:
JOHN E. WALSH,
HERBERT DUNN.